April 26, 1960 R. A. GURRIES ET AL 2,934,078
PENDULUM CONTROLLED VALVE ACTUATING MECHANISM
Filed Nov. 24, 1958 4 Sheets-Sheet 1

INVENTORS
R. A. Gurries
John Curlett
BY
ATTYS

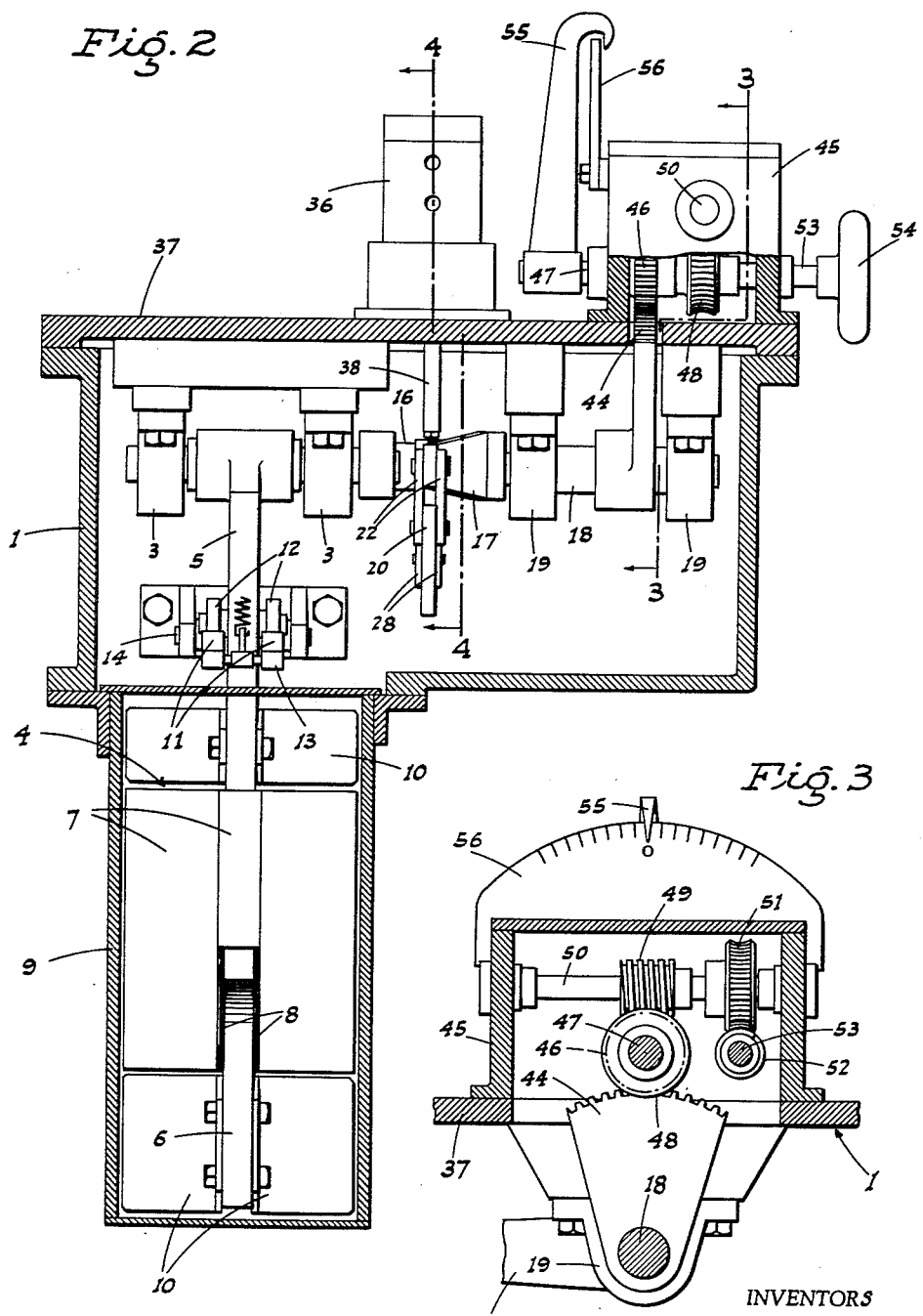

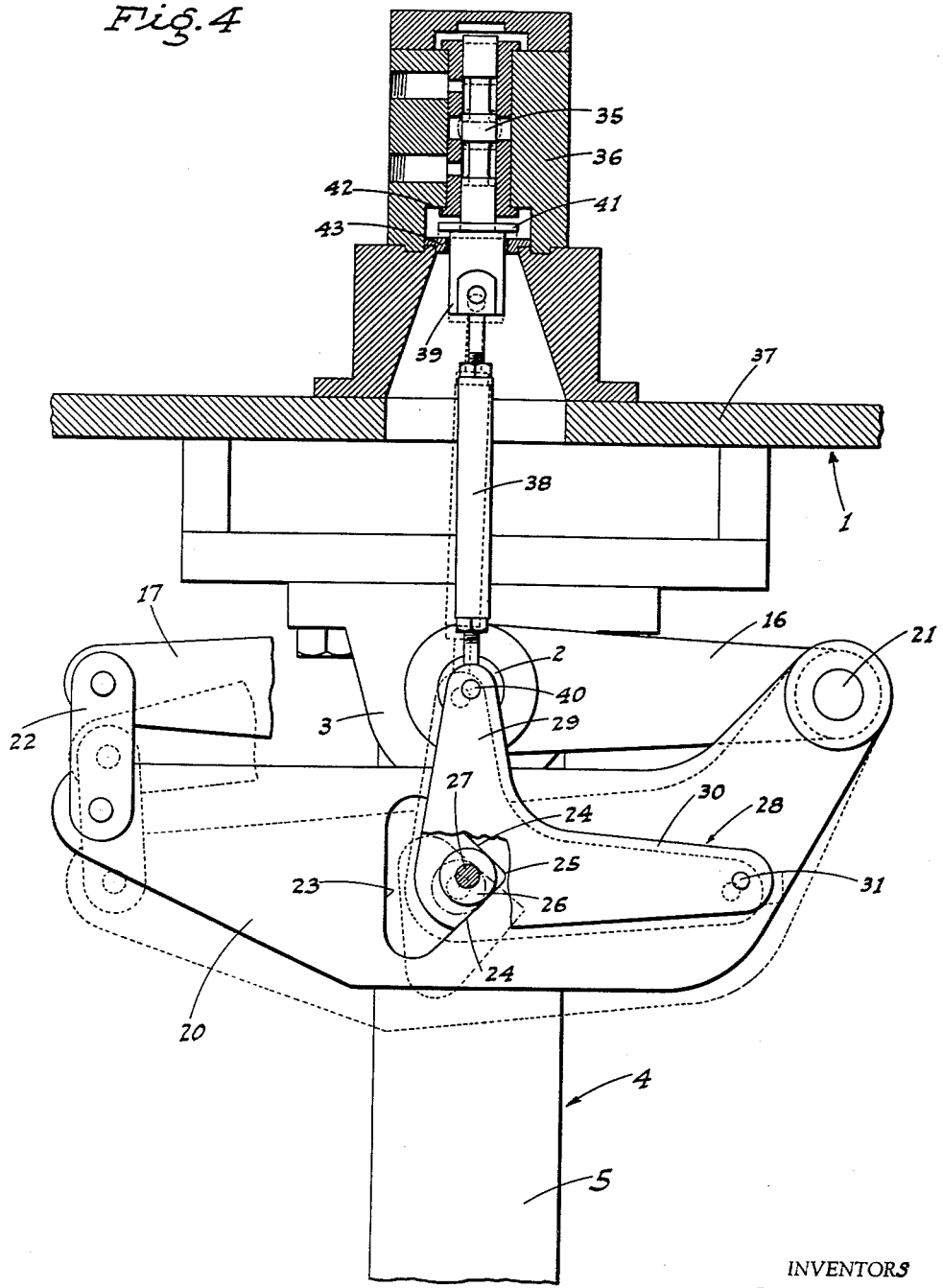

April 26, 1960   R. A. GURRIES ET AL   2,934,078
PENDULUM CONTROLLED VALVE ACTUATING MECHANISM
Filed Nov. 24, 1958   4 Sheets-Sheet 4
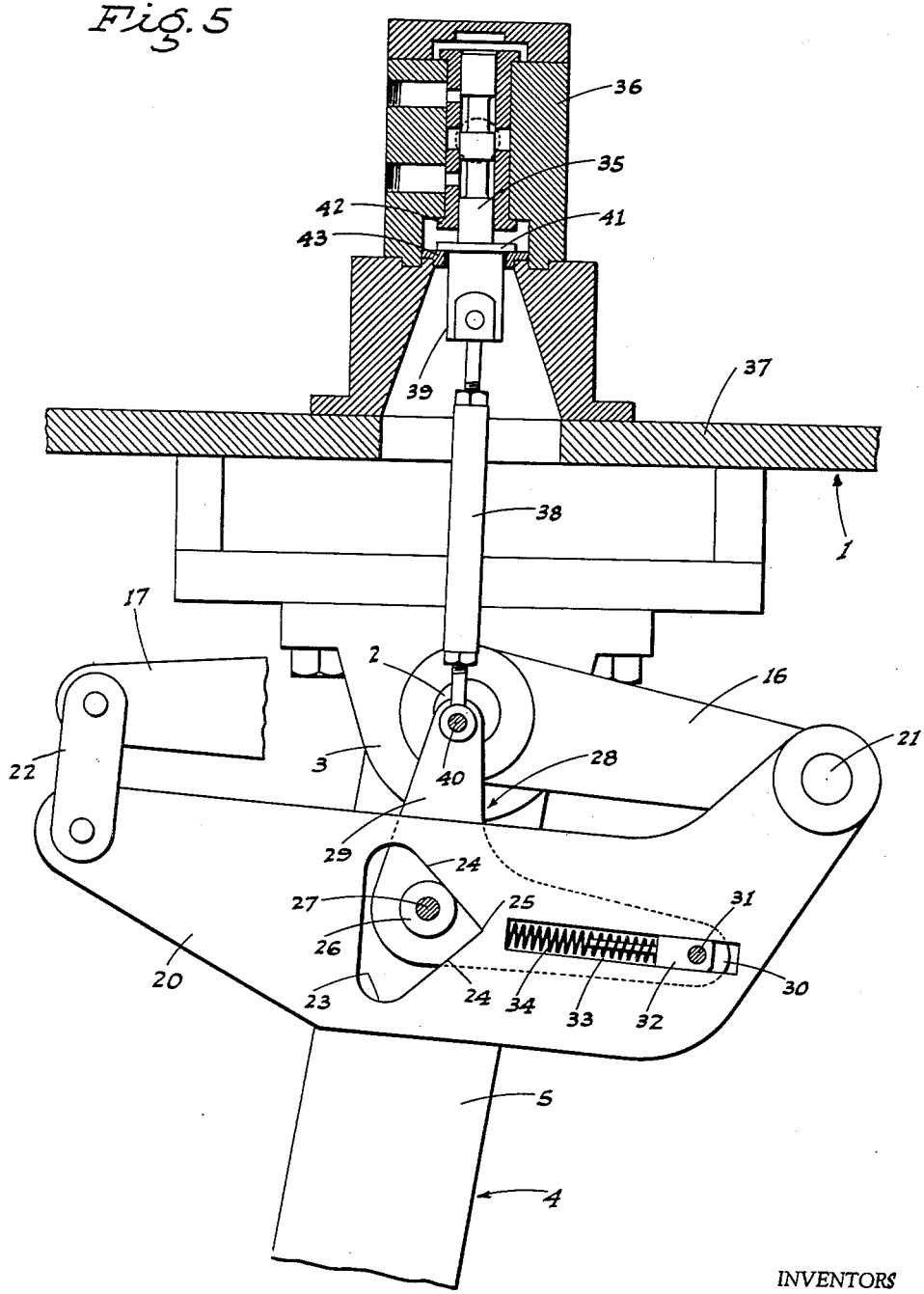
INVENTORS
R.A. Gurries
John Curlett
BY
ATTYS

United States Patent Office 2,934,078
Patented Apr. 26, 1960

2,934,078

PENDULUM CONTROLLED VALVE ACTUATING MECHANISM

Raymond A. Gurries, San Jose, and John Curlett, Los Gatos, Calif., assignors to Gurries Manufacturing Co., San Jose, Calif., a corporation of California Application November 24, 1958, Serial No. 775,811

4 Claims. (Cl. 137—45)

This invention relates to a pendulum controlled valve for use on a device, such as a road grader or the like, whose level, or lateral slope, is to be maintained constant, and particularly represents improvements over the mechanism for this purpose shown in the copending application of R. A. Gurries and John Curlett, filed September 20, 1957, Serial No. 685,106, now Patent No. 2,883,777 on Lateral Level Control Mechanism for Road Graders.

The valve used for the purpose is of the axially movable piston or plunger type, and the major object of the present invention is to improve the pendulum operated mechanism for opening the valve so that the tendency for a lateral binding pressure to be placed on the valve as the same is opened is reduced. As a result, a smooth valve movement and a very accurate response of the valve to pendulum movements is obtained.

Another object of the invention is to provide a pendulum arranged so that its weight may be altered if desired, and so that its freedom of swinging may be controlled and varied.

It is also an object of the invention to provide a practical and reliable pendulum controlled valve actuating mechanism, and one which will be exceedingly effective for the purpose for which it is designed.

These objects are accomplished by means of such structure and relative arrangement of parts as will fully appear by a perusual of the following specification and claims.

In the drawings:

Fig. 2 is a transverse sectional elevation, substantially on line 2—2 of Fig. 1.

Fig. 3 is a fragmentary sectional elevation on line 3—3 of Fig. 2.

Fig. 4 is a fragmentary enlarged sectional elevation, taken substantially on line 4—4 of Fig. 2, showing the valve closed and with the pendulum in its normal dependent position.

Fig. 5 is a similar view, but showing the pendulum as swung to one side and the valve open.

Figure 1:
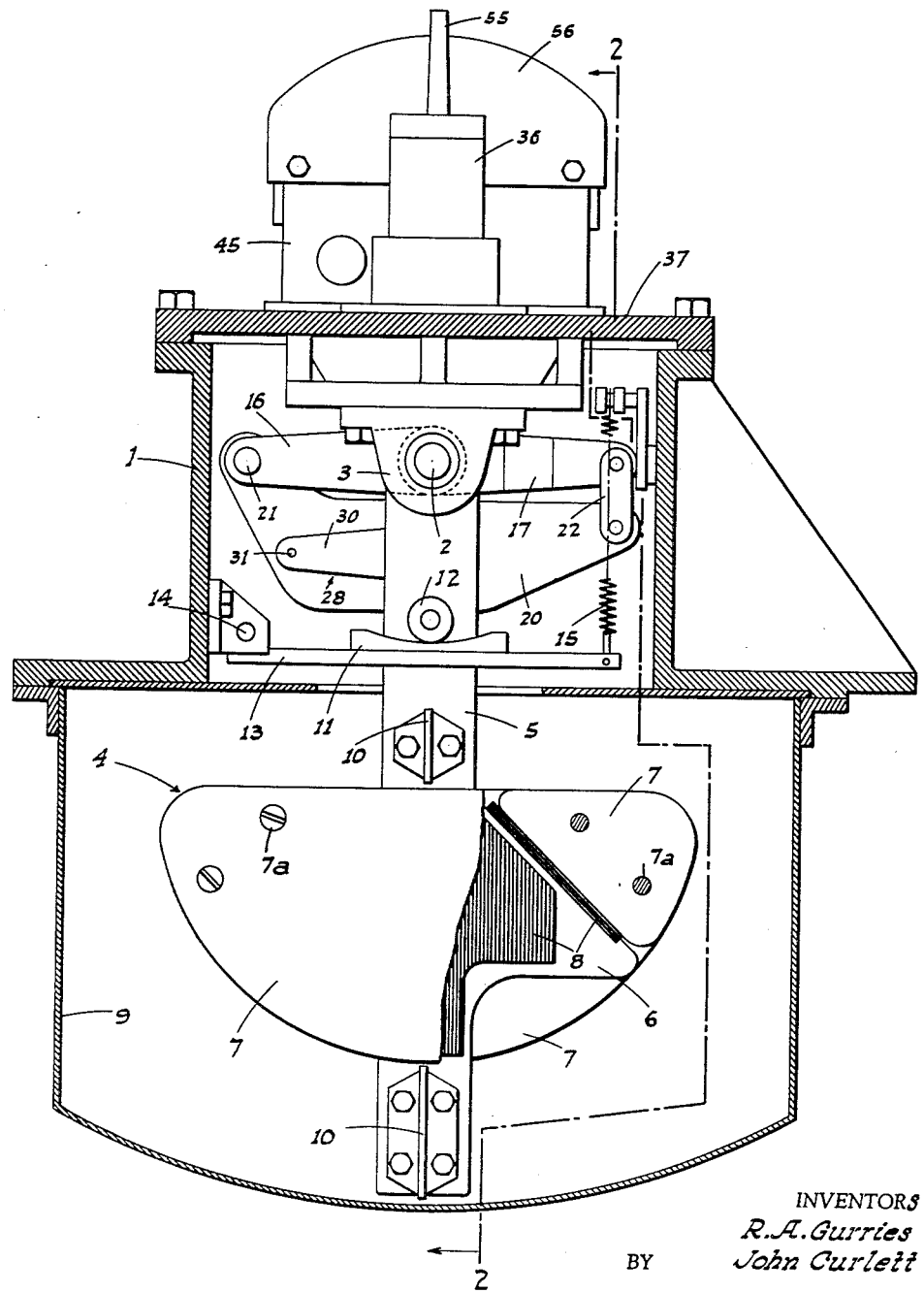
Fig. 1 is an elevation of the pendulum and valve unit, with the housing in section and showing the pendulum mechanism in its normal or neutral position.

Referring now more particularly to the characters of reference on the drawings, the pendulum and valve unit comprises a rigid supporting housing 1 adapted to be mounted in a fixed position on a grader or other implement having an operating part thereon whose level is to be controlled by a relative swinging movement of the pendulum.

A shaft 2, which extends transversely of the housing, is turnably mounted therein on suitable bearing blocks 3. A pendulum, indicated generally at 4, is hung from the shaft; such pendulum including a shank 5 secured on the shaft, and at its lower end being of T-form, as shown at 6, with downwardly sloping edges and supporting a number of weights 7 detachably secured together, as by screws or bolts 7a, and maintained from contact with the shank by sheets 8 of rubber or similar cushion material.

The weighted portion of the pendulum depends into an oil-filled well 9 supported by and depending from the housing 1; free swinging of the pendulum being dampened by vanes 10 mounted on the pendulum shank above and below the weights 7, in crossing relation to the direction of swing of the pendulum.

Freedom of swinging of the pendulum is also controlled by means of a pair of cradles 11 extending alongside the shank 5 parallel to its direction of movement and engaged by rollers 12 mounted on the shank on opposite sides thereof. The cradles are mounted on horizontal arms 13 pivoted at one end as a unit in connection with one end wall of the housing 1, as at 14, and at the other end being connected to a vertically adjustable tension spring 15 hung from the opposite end wall of the housing.

A normally horizontal arm 16 projects from and is rigidly secured on the shaft 2 at the inner end thereof, while another similar arm 17 is fixed on and normally projects horizontally and in a direction opposite that of the arm 16 from another shaft 18 axially alined with but separate from shaft 2, and turnably mounted in bearing blocks 19 supported in the housing 1 (see Fig. 2). The means to control the rotation of shaft 18 will be described later.

A plate-like lever 20 is pivoted at one end on the outer end of arm 16, as shown at 21, while at its other end said lever is in effect pivotally connected to the outer end of arm 17 by a depending link unit 22 extending between said arm and lever, as clearly shown.

The lever 20 is formed intermediate its ends with a slot 23 of generally triangular configuration, with the opposite sides 24 of the slot diverging from the apex 25 in symmetrical relation to a normal horizontal plane; said apex facing in the direction of the pivoted end 21 of the lever.

A roller 26 rides in the slot and normally engages both said opposite sides 24 of said slot, as shown in Fig. 4. The spindle 27 of the roller is mounted in an L-shaped lever 28 which actually comprises a pair of connected members which straddle the lever 20, as shown. The lever 28 comprises an upstanding leg 29 and a substantially horizontal leg 30 which extends in the direction of the pivoted end 21 of lever 20. The roller spindle 27 is located at the junction of the legs 29 and 30. The leg 30 is pivoted at its outer end on a pin 31 mounted in block 32 slidable in a longitudinal slot 33 in lever 20, and which projects toward the apex of slot 23, as shown in Fig. 5. A compression spring 34 is disposed in the slot 33 and acts to urge block 32 in a direction away from slot 23, and thus acts on lever 28 to hold roller 26 in contact with the sides 24 of slot 23.

A piston valve plunger 35 is mounted in a valve housing 36 supported by and upstanding from the top plate 37 of housing 1; the axial line of the valve being vertical and intersecting the axis of shaft 2. Such axial line also intersects the axis of the roller spindle 27 when the roller is in its normal slot-side engaging position and the pendulum is in its normal perpendicular position.

A rod unit 38 is pivoted at its upper end on a head 39 connected to and depending from the plunger 35, and at its lower end is pivoted, as at 40, on the upper end of lever arm 29; the axis of pivot 40 being alined with that of shaft 2 when the pendulum is in a normal position relative to housing 1 and the valve is closed, as shown in Fig. 4.

The valve is arranged to open both upon an upward and a downward movement from the closed position; any such valve movement being limited by the engagement of a flange 41 on head 39 with fixed shoulders 42 and 43 above and below said flange, respectively, and normally spaced evenly from the flange.

In order to controllably rotate the shaft 18 when desired, or hold the same stationary in any rotated position, the following arrangement is provided, as shown in Figs. 2 and 3:

Secured on and upstanding from shaft 18 is a segmental gear 44 which projects through the top plate 37 of housing 1 and into an auxiliary housing 45 mounted on said top plate 37. Gear 44 meshes with a pinion 46 fixed on a shaft 47 journaled in housing 45 and parallel to shaft 18. A worm wheel 48 is fixed on shaft 47 and is engaged by a worm 49 fixed on a counter-shaft 50 journaled in housing 45 at right angles to shaft 47. Also fixed on shaft 50 is a worm wheel 51 engaged by a worm 52 fixed on a shaft 53 journaled in housing 45 parallel to shaft 47. Shaft 53 projects from the back of housing 45 and carries a hand wheel 54.

From the above description, it will be seen that the extent of rotation of shaft 18 may be controlled within very close limits by rotation of the hand wheel 54; the dual worm arrangement insuring against the shaft 18 moving of itself from any set position. The extent to which said shaft 18 is rotated from the normal or neutral position thereof is visually evidenced by means of a pointer 55 fixed on and upstanding from shaft 47 outside the housing 45 and reading on a dial 56 graduated in degrees or the like and exposed to the operator manipulating the hand wheel 54.

In operation, with any relative swinging movement of the pendulum 4 to one side or the other from the normal position of Fig. 4, as for instance to the left as shown in Fig. 5, the arm 16 is correspondingly swung down. This causes lever 20 to swing down about link 22 as an axis, taking the bellcrank lever 28 with it. This in turn causes the rod 38 to pull down the valve plunger 35 and move the same to an open position with but slight deviation of the rod from its normal axially alined position with the valve plunger.

The valve is fully opened with a very small axial movement of the plunger; further movement being prevented by engagement of flange 41 with shoulder 43. The lever 20 however is apt to be swung considerably more than is required to thus fully open the valve. When this occurs, the roller 26 of bellcrank lever 28, and which roller is initially held in the apex of slot 23 due to the pull of spring 34, moves up the sloping edge 24 of slot 23; the spring becoming further compressed and the lever pivoting block 32 moving along slot 33. Due to the specific bellcrank mounting and arrangement relative to lever 20, the axial position of the pivot pin 40 of the push-pull rod 38 relative to the axial shaft 2 of the pendulum varies but slightly to the right or left of the axis of shaft 2 with any swinging movement of lever 20 and the resultant position of the bellcrank lever roller 26 in slot 23. There is therefore but little deviation of rod 38 from axial alinement with the valve plunger irrespective of the extent of relative swinging movement of the pendulum within the limits imposed by the enclosing structure.

If the pendulum relatively swings to the right and the arm 16 lifts to correspondingly swing the lever 20 upwardly, the rod 38 is pushed up to again open the valve, but with an upward rather than a downward movement of the valve plunger.

When it is desired to cause the valve to open by a manually imparted action, the arm 17 is swung up or down by manipulation of the hand wheel 54, as previously described. This causes lever 20 to be swung about the then stationary pin 21 as an axis, as indicated in dotted lines in Fig. 4. This results in a movement of the bellcrank lever 28 to open the valve 35, in the same manner as when the lever 20 is swung by pendulum action, as previously described.

From the foregoing description it will be readily seen that there has been produced such a mechanism as will substantially fulfill the objects of the invention, as set forth herein.

While this specification sets forth the present and preferred construction of the mechanism, still in practice such deviations therefrom may be resorted to as do not form a departure from the spirit of the invention, as defined by the appended claims.

Having thus described the invention, the following is claimed as new and useful, and upon which Letters Patent are desired:

1. A pendulum controlled valve actuating device comprising, with a valve which includes an axially movable vertically disposed plunger, the pendulum having an axial shaft swingable therewith; a linkage and cam mechanism connecting the pendulum shaft to said plunger comprising a lever extending transversely of the shaft below the same, an arm rigid with the pendulum projecting from the upper end thereof and pivoted at its outer end on the lever at one end thereof, means swivelly supporting the lever at its other end in a substantially fixed position, a bellcrank lever disposed in a vertical plane parallel to and adjacent the first named lever, the bellcrank lever including a substantially horizontal leg extending in the direction of the pivoted end of the first named lever, and a vertical leg disposed in substantially axial alinement with the valve plunger, means pivotally supporting the horizontal leg at its outer end on the first named lever, means connecting the upper end of the vertical leg and the lower end of the valve plunger, the first named lever having a slot provided with diverging side edges, a roller on the bellcrank lever substantially at the junction of the legs, said roller riding in the slot and engaging one of said side edges thereof, and a spring mounted on the first named lever and operatively connected to the bellcrank lever to pull the roller against said slot edges adjacent the junction thereof.

2. A mechanism, as in claim 1, in which said connecting means comprises a push-pull rod pivotally connected to the vertical leg and the axis of such pivot being normally in substantially axial alinement with the axis of the shaft.

3. A pendulum controlled valve actuating device comprising, with a valve which includes an axially movable vertically disposed plunger, the pendulum having an axial shaft swingable therewith; a linkage and cam mechanism connecting the pendulum shaft to said plunger comprising a lever extending transversely of the shaft below the same, an arm rigid with the pendulum projecting from the upper end thereof and pivoted at its outer end on the lever at one end thereof, means swivelly supporting the lever at its other end in a substantially fixed position, a bellcrank lever disposed in a vertical plane parallel to and adjacent the first named lever, the bellcrank lever including a substantially horizontal leg extending in the direction of the pivoted end of the first named lever, and a vertical leg disposed in substantially axial alinement with the valve plunger, means connecting the upper end of the vertical leg and the lower end of the valve plunger, the first named lever having a slot provided with side edges diverging from an apex which faces the pivoted end of the first named lever, said roller riding in the slot and engaging one of the side edges thereof, the first named lever having another longitudinally extending slot disposed between the apex of the first named slot and the pivoted end of the first named lever, a block slidable in the longitudinal slot, a pivot connection between the block and the outer end of the horizontal leg of the bellcrank, and a spring mounted in said longitudinal slot and engaging the block and the end of said longitudinal slot opposite the block and urging the latter in a direction away from the first named slot.

4. A mechanism, as in claim 3, in which the bellcrank lever comprises transversely spaced parts straddling the plate, the roller being between the parts and the block and spring being retained against displacement laterally by said parts.

References Cited in the file of this patent

UNITED STATES PATENTS

| | | |
|---|---|---|
| 191,954 | Gissinger | June 12, 1877 |
| 1,037,937 | Lebherz | Sept. 10, 1912 |
| 2,088,528 | McCune | July 27, 1937 |
| 2,089,640 | Cotterman | Aug. 10, 1937 |
| 2,170,269 | Schoenleber | Aug. 22, 1939 |
| 2,460,159 | White | Jan. 25, 1949 |
| 2,567,774 | LeClair | Sept. 11, 1951 |
| 2,583,250 | Ball | Jan. 22, 1952 |
| 2,684,683 | Brown | July 27, 1954 |
| 2,747,593 | Royer | May 29, 1956 |
| 2,883,777 | Gurries | Apr. 28, 1959 |

FOREIGN PATENTS

| | | |
|---|---|---|
| 268,635 | Great Britain | Apr. 7, 1927 |